(12) United States Patent
Honda

(10) Patent No.: US 6,947,829 B2
(45) Date of Patent: Sep. 20, 2005

(54) APPARATUS FOR DETECTING KNOCKING OF INTERNAL COMBUSTION

(75) Inventor: Takayoshi Honda, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/823,668

(22) Filed: Apr. 14, 2004

(65) Prior Publication Data

US 2004/0204814 A1 Oct. 14, 2004

(30) Foreign Application Priority Data

Apr. 14, 2003 (JP) ........................................ 2003-109409

(51) Int. Cl.[7] .............................................. G01L 23/08
(52) U.S. Cl. .................. 701/111; 73/35.01; 123/406.38
(58) Field of Search ........................ 701/111; 73/35.01, 73/35.05, 117.3; 123/406.21, 406.38, 406.39

(56) References Cited

U.S. PATENT DOCUMENTS

| | | | | |
|---|---|---|---|---|
| 5,190,011 A | * | 3/1993 | Hashimoto et al. | .... 123/406.38 |
| 5,996,398 A | * | 12/1999 | Schleupen et al. | ......... 73/35.05 |
| 6,289,720 B1 | * | 9/2001 | Ohkubo et al. | ............ 73/35.01 |

FOREIGN PATENT DOCUMENTS

| JP | 58-28646 | 2/1983 |
|---|---|---|
| JP | 60-82931 | 5/1985 |
| JP | 5-26721 | 2/1993 |
| JP | 7-109949 | 4/1995 |
| JP | 7-293314 | 11/1995 |
| JP | 2001-164982 | 6/2001 |

OTHER PUBLICATIONS

"Design of IIR Filter" by H. Ochi; Digital Signal Processing Learned Through Simulation; Jul. 1, 2001; pp., 92–96 (W/partial English translation).

* cited by examiner

Primary Examiner—Hieu T. Vo
(74) Attorney, Agent, or Firm—Nixon & Vanderhye P.C.

(57) ABSTRACT

An apparatus is provided for detecting an occurrence of knocking of an engine from a signal sensed by a knocking sensor for the engine. The apparatus comprises plural filters extracting, from the signal, plural signal components whose frequency bands mutually differ and a unit determining whether or not there is the occurrence of knocking, based on results outputted from the plural filters. The plural filters include first and second types of filters. The first type of filter has a pass band set to a specific frequency band including a specific frequency of the signal. This specific frequency indicates the occurrence of knocking. The second type of filter has a pass band set to another specific frequency band. An inclination of a filtering characteristic of the second type of filter at a cut-off frequency thereof is steeper than that the first type of filter.

19 Claims, 13 Drawing Sheets

APPARATUS FOR DETECTING KNOCKING OF INTERNAL COMBUSTION

BACKGROUND OF THE INVENTION

1. Technical Field

The present invention relates to an apparatus for detecting knocking occurring in an internal combustion.

2. Related Art

For driving an internal combustion, it is usually required to have an apparatus for detecting knocking occurring in the internal combustion. Conventional techniques for detecting the occurrence of knocking have already been proposed by various references.

One example is disclosed by a Japanese Patent Laid-open (unexamined) publication No. 7-293314 (refer to pages 2–3 and FIG. 5 thereof).

This reference discloses determination as to whether or not there occurs a knocking of an internal combustion. Practically, a knocking sensor is used to detect a signal indicative of a knocking of an internal combustion. This signal from the knocking sensor is subjected to A/D conversion at specified sampling intervals. The A/D-converted data, which are outputted sequentially in time, is sent to a plurality of digital filters whose pass ranges are different from each other. Outputs from those digital filters are used to find out whether or not the internal combustion has caused a knocking phenomenon in an engine. In the example shown by the above reference, the plural digital filters include two digital filters: one passes a signal whose frequencies have a peak in response to the occurrence of a knocking (that is, a knocking signal), and the other passes a signal whose frequencies have a peak in response to the occurrence of noise (that is, a noise signal other than the knocking signal).

Another reference is a Japanese Patent Laid-open (unexamined) 2001-164982, which teaches an idea of using a filter filtering a knocking signal from an oscillation signal wave from a knocking sensor. This reference teaches that it is desirable that the bandwidth (Q value) of the filter be a value not so higher, for example, less than 10 dB. Further, there is another reference, a Japanese Patent Laid-open (unexamined) No. 5-26721 (refer to pages 2 and 5), which teaches that the frequency of knocking oscillation varies depending on operation states of an engine. Another reference is a Japanese Patent Laid-open (unexamined) 7-109949, which discloses the teaching that a knocking sensor signal including signal components indicative of knocking and noise components and the spectrum of the signal components is larger in amplitude than the spectrum of the noise components. On the other hand, it has been known that, as the digital filter, an FIR (finite impulse response) filter and an IIR (infinite impulse response) filter can be used. As the IIR filter, there are filters of such characteristics as Butterworth characteristics and the Chebyshev characteristics.

However, in the case that, as suggested by the foregoing reference (publication No. 7-293314), the outputs from the plural filters are used to determine whether or not there occurs a knocking phenomenon in a combustion engine, there still exist some problems as follows.

The problems will now be explained with reference to FIGS. 13 and 14, each of which exemplifies the filtering characteristics of five filters filt1 to filt5 for knocking monitor (in the figures, the vertical and horizontal axes denote a gain and a frequency). In both the figures, the filtering characteristic of each filter filt1 (to filt5) is expressed by a dashed line, while a knocking sensor signal is expressed by a solid line. The knocking sensor signal is shown in the form of a signal modified, with the horizontal-axis values being logarithmic, from that shown in FIG. 16 of the foregoing reference (publication No. 7-109949), in which the signal is obtained when the knocking occurs. As to the knocking sensor signal, the vertical axis in FIGS. 13 and 14 indicates the spectrum amplitude. Each of the filters filt1 to filt5 shown in FIGS. 13 and 14 is composed of a forth-order band-pass filter formed by combining a second-order low-pass filter and a second-order high-pass filter with each other.

Of the five filters filt1 to filt5, each of three filters filt1 to filt3 has a pass band assigned to a specific frequency range including each of specific frequencies of the knocking sensor signal. The specific frequencies, which clearly indicate the occurrence of knocking, are, for example, 7 kHz, 12 kHz (corresponding to the 1.5-th order harmonic of 7 kHz), and 15.5 kHz (corresponding to the second harmonic of 7 kHz). That is, those three filters filt1 to filt3 are set to have three passing frequency bands of predetermined bandwidths each having center frequencies each of 7 kHz, 12 kHz, and 15.5 kHz serving as three knocking frequencies. Hereinafter, the filters filt1 to filt3 are referred to as "knocking-signal filters."

The remaining two filters filt4 and filt5 have passing frequency bands, which are different from the foregoing frequency bands for the three knocking frequencies and assigned to specific frequency ranges including each of specific frequencies which can be regarded as noise within the knocking sensor signal. In this example, such specific frequencies are 3 kHz and 4.5 kHz corresponding to the 1.5-th order harmonic of 3 kHz. That is, those two filters filt4 to filt5 are set to have two passing frequency bands of predetermined bandwidths each having center frequencies each of 3 kHz and 4.5 kHz. Hereinafter, the filters filt4 and 5 are referred to as "noise filters."

As understood from FIG. 13, when the Q values of the filters filt1 to filt5 are low (in this example, Q=10 dB), there is a fear that the noise filter filt5 is influenced by the knocking signal. Specifically, the filter filt5 whose center frequency $f_0$=4.5 kHz still has a considerably higher attenuation rate at a knocking frequency of 7 kHz, while the knocking signal is larger in amplitude than the noise. Hence the presence of the knocking signal 7 kHz affects the noise filter filt5.

Accordingly, as shown in FIG. 13, in cases where all of the knocking signal filters filt1 to filt3 and the noise filters filt4 and filt5 are given low Q values, one or more noise filters frequently result in response to knocking occurring at an internal combustion. This deteriorates an S/N ratio, whereby the knocking cannot be detected with precision.

In contrast, FIG. 14 exemplifies a case in which the knocking signal filters filt1 to filt3 and the noise filters filt4 and filt5 are given low Q values (in this example, Q=25 dB). In this case, it cannot be expected to have the knocking detected with precision, if the frequencies of the knocking signal (i.e., the knocking frequencies) are shifted due to operation conditions and/or ageing of an engine. Namely, even when the knocking frequencies are shifted slightly, those frequencies are forced to be filtered at largely different gains (especially, to the filters filt1 to filt3).

SUMMARY OF THE INVENTION

The present invention has been made with due consideration to the foregoing difficulties, and an object of the present invention is to provide a knocking detecting apparatus capable of detecting the occurrence of knocking with precision.

In order to accomplish the foregoing objects, as one aspect of the present invention, there is provided an apparatus for detecting occurrence of knocking of an engine from a signal sensed by a knocking sensor attached to the engine. The apparatus comprises a plurality of filters extracting, from the signal sensed by the knocking sensor, a plurality of signal components whose frequency bands differ from each other; and a knocking determination unit determining whether or not there is the occurrence of knocking on a basis of results outputted from the plurality of filters. In this configuration, the plurality of filters include a first type of filter (i.e., "knocking-signal filter") of which pass band is set to a first specific frequency band including a first specific frequency of the signal from knocking sensor, the first specific frequency (i.e., knocking frequency) indicating the occurrence of knocking, and a second type of filter (i.e., "noise filter") of which pass band is set to a second specific frequency band other than the first specific frequency band. Both of the first and second types of filters have filtering characteristics, an inclination of the filtering characteristic of the second type of filter at a cut-off frequency thereof being steeper than an inclination of the filtering characteristic of the first type of filter at a cut-off frequency thereof. The cut-off frequency is defined as a frequency measured when the gain is reduced down by an amount of 3 dB.

Hence, the above configuration is able to resolve both the problems described in connection with FIGS. 13 and 14.

Compared to the first type of filter, the second type of filter is able to provide a filtering characteristic in which each range from its pass band to each stop band has gains attenuating along a steeper curve (i.e., the inclination of a transient band between the pass band to each stop band is steeper). This steeper characteristic curve provides sufficiently attenuated gains at one or more knocking frequencies. Accordingly, when the knocking occurs, it is preventable that signals indicative of the knocking frequencies (i.e., knocking signals) affect the second type of filter. In this case, the affection means that the second type of filter responds to the occurrence of the knocking.

By contrast, compared to the second type of filter, the first type of filter is able to provide a filtering characteristic in which each range from its pass band to each stop band has gains attenuated moderately. Hence, even if knocking frequencies shift in some degree due to some factors, such as operation states of the engine and/or aging of the engine, the first type of filter is able respond to the knocking signals, because the filter is wider to respond to such signals thanks to moderate attenuation curves. Accordingly the first type of filter has the capability of sufficiently responding to the knocking signals.

The combination of the first and second types of filters allows the knocking detection apparatus to have an improved accuracy for detecting the occurrence of the knocking.

In the foregoing basic configuration, it is preferable that the second type of filter is higher in a filter order than the first type of filter. This provides the second type of filter with steeper filtering characteristic at its cut-off frequency, compared to that of the first type of filter. The reason can be explained based on FIG. 1A. As shown in FIG. 1A, as long as the Q value is the same, the higher a filter order, the steeper the filtering characteristic at its cut-off frequency. In FIG. 1A, a reference $f_0$ denotes a center frequency and a reference B denotes a pass band (bandwidth).

In this way, the first type of filter can be constructed with a lower order. This simplifies circuitry if the filter is an analog filter, while simplifying filtering if the filter is a digital filter.

In addition, because of the lower filter order, the first type of filter is quicker to response to the peak of a knocking signal. Because of the higher filter order, the second type of filter can be free from being affected by a knocking signal of greater level, thereby detecting a background level (i.e. noise signals). In consequence, an S/N obtained when the peak of a knocking signal can be made larger, being advantageous in detecting the knocking based on the S/N.

Still preferably, the second type of filter is higher in a Q value than the first type of filter, which also gives a steeper inclination to the filtering characteristic of the second type of filter at its cut-off frequency. In this case, as shown in FIG. 1B, provided that the filter order is the same, the higher the Q value, the steeper the filtering characteristic at the cut-off frequency.

In this configuration, by way of example, the Q value of the first type of filter is set to a value for optimizing the detection of the knocking signal, while the Q value of the second type of filter is made higher than that of the first type of filter.

Other features and advantages of the present invention will be clearly understood from the appending drawings and the following description of embodiments.

BRIEF DESCRIPTION OF THE DRAWINGS

Other objects and aspects of the present invention will become apparent from the following description and embodiments with reference to the accompanying drawings in which.

DETAILED DESCRIPTION OF PREFERRED EMBODIMENTS

Referring to the accompanying drawings, preferred embodiments of the present invention will now be described.

FIRST EMBODIMENT

Referring to FIGS. 1 to 10, a first embodiment of the present invention will now be described. In this embodiment, an engine control apparatus 10 for a gasoline engine with 6 cylinders (i.e., an internal combustion) is exemplified, in which the knocking detection apparatus according to the present invention is reduced into practice.

Figure 3:
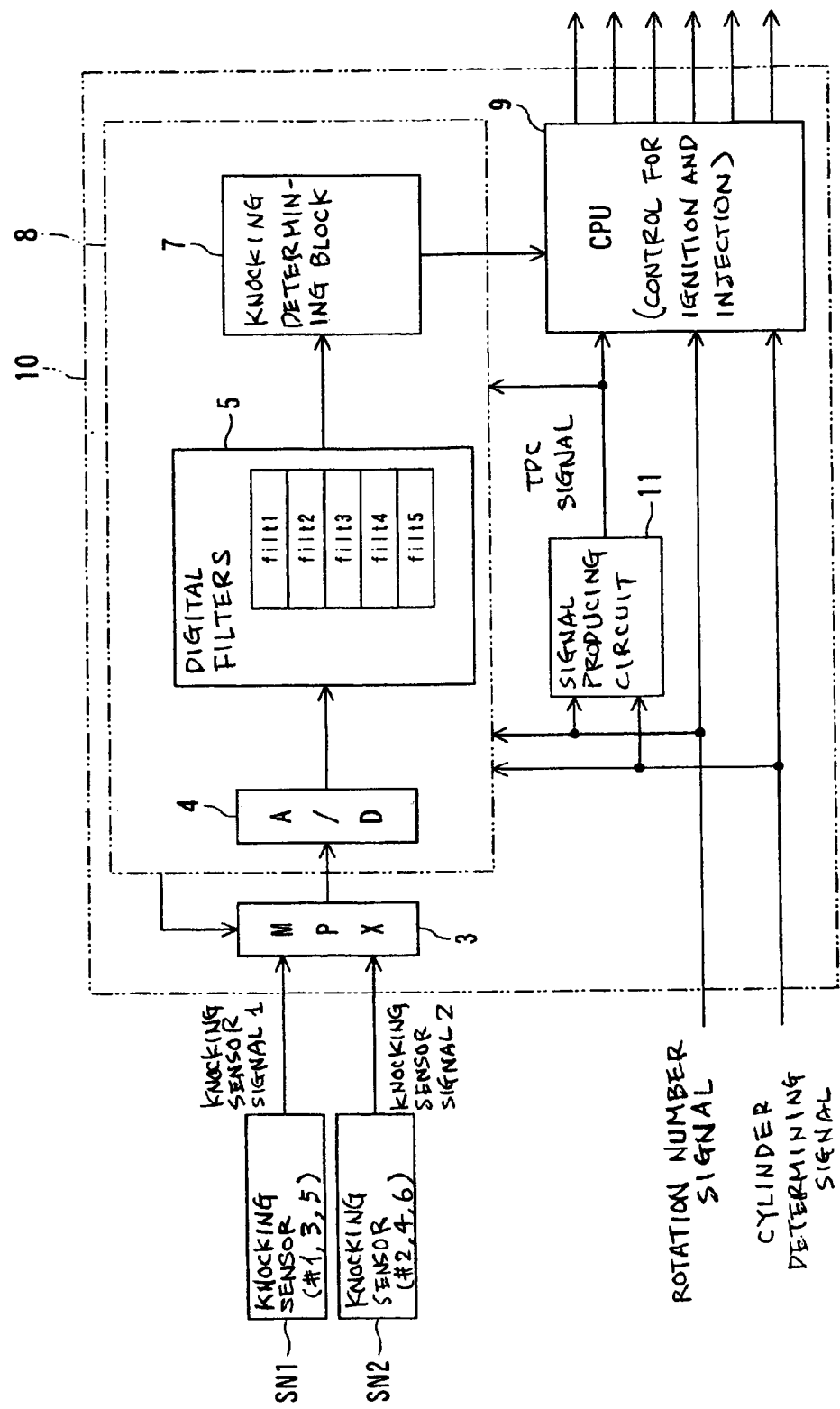
FIG. 3 is a block diagram outlining the configuration of an engine control apparatus according to a first embodiment of the present invention.

As shown in FIG. 3, the engine control apparatus 10 according to the first embodiment is configured to receive two knocking sensors SN1 and SN2. One knocking sensor SN1 is attached to the engine to detect knocking conditions of three cylinders among all the six cylinders. In this embodiment, such cylinders assigned to the knocking sensor SN1 are the first, third and fifth cylinders #1, #3 and #5. This sensor SN1 outputs an analog-quantity signal indicative of knocking states of those cylinders (hereinafter, referred to as a knocking signal 1). On the other hand, the other knocking sensor SN2 is also attached to the engine to detect knocking conditions of the remaining three cylinders that are the second, fourth and sixth cylinders #2, #4 and #6. This sensor SN2 outputs another analog-quantity signal indicative of knocking states of those cylinders (hereinafter, referred to as a knocking signal 2).

The engine control apparatus 10, which receives the above knocking signals 1 and 2, is equipped with a multiplexer (MPX) 3, an A/D converter 4, a digital filtering block 5, a knocking determination block 7, a CPU (Central Processing Unit) 9, and a signal producing circuit 11.

Of these components, the multiplexer 3 receives the knocking signals 1 and 2 to alternately select either one of those signals 1 and 2. The A/D converter 4 is in charge of A/D conversion, at regular sampling intervals (for example, 10 $\mu$sec), of the knocking signal selected by the multiplexer 3. Thus, from the A/D converter 4, A/D-converted value data (i.e., sampled data) is outputted in sequence and fed to the next digital filtering block 5.

The digital filtering block 5 has a plurality of types of digital filters, of which filtering frequencies are different from each other. At this block 5, those plural filters are applied to the sampled data that has been received. Results outputted from the digital filtering block 5 (i.e., result data processed by the digital filters) are used by the knocking determination block 7 to determine whether or not there occurs a knocking phenomenon at the engine.

Information about a determined result indicative of whether or not the knocking phenomenon is caused at the engine is then sent to from the knocking determination block 7 to the CPU 9. Using this information as well as information in relation to other operation conditions, such as engine rotation speed and coolant temperature, the CPU 9 performs engine control. This engine control includes control for ignition timing and fuel injection amount.

Figure 13:
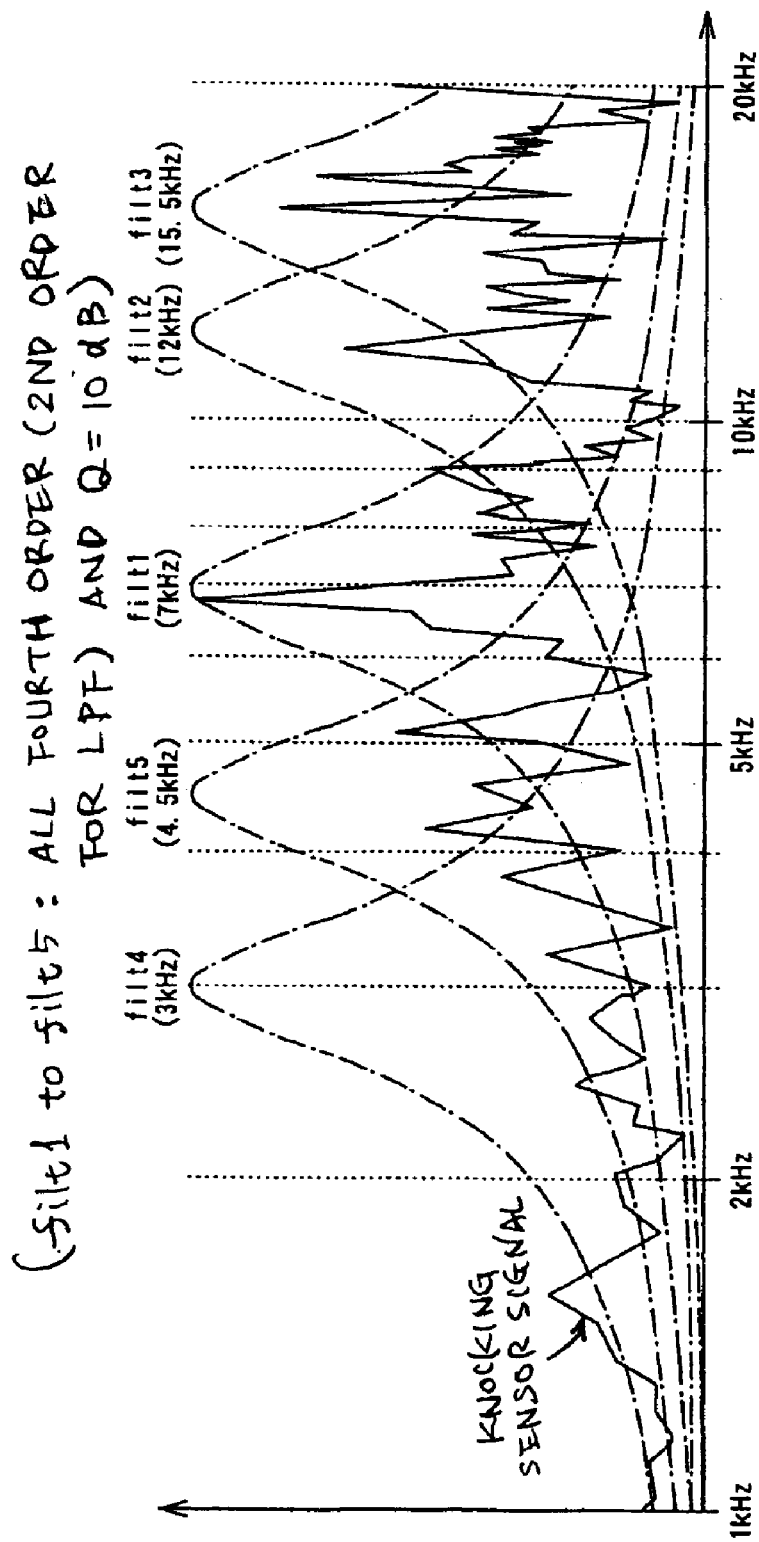
FIG. 13 is a frequency spectrum of conventional filters.

The plurality of digital filters, which are functionally carried out by the digital filtering block 5, are identical to the five filters filt1 to filt5 exemplified with FIG. 13. In other words, of the five filters filt1 to filt5, three filters filt1 to filt3 (knocking-signal filters) are set to have pass bands assigned to specific frequency ranges of which central knocking frequencies are 7 kHz, 12 kHz and 15.5 kHz, respectively, and of which Q values are 10 dB, respectively. By contrast, the remaining two filters (noise filters) filt4 and filt5 are given pass bands other than bands including the foregoing three knocking frequencies. Those pass bands assigned to the filters filt4 and filt5 are, for example, specific frequency ranges, each having a Q value of 10 dB, whose central frequencies are 3 kHz and 4.5 kHz, respectively, which can be regarded as being noise in a knocking sensor signal.

Figure 4:
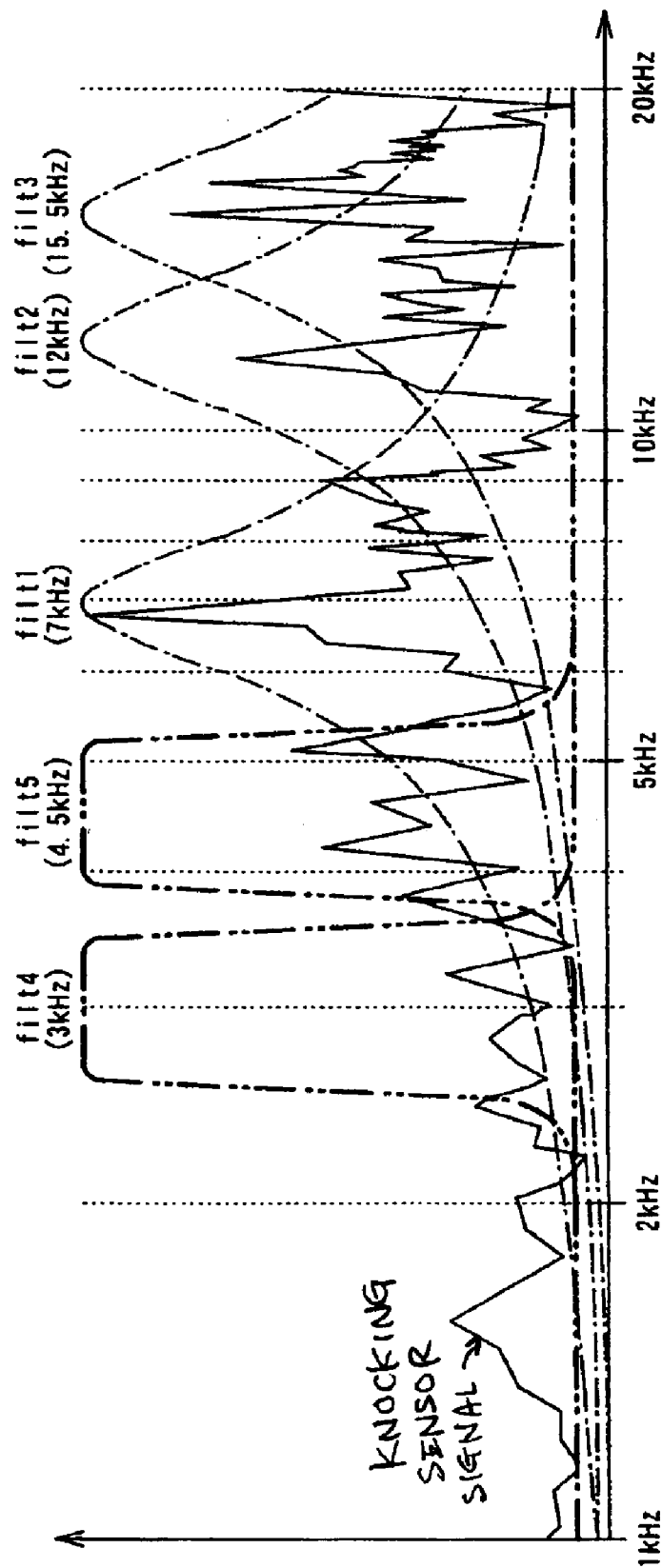
FIG. 4 is a frequency spectrum of five filters filt1 to filt5 employed in the first embodiment.
Figure 14:
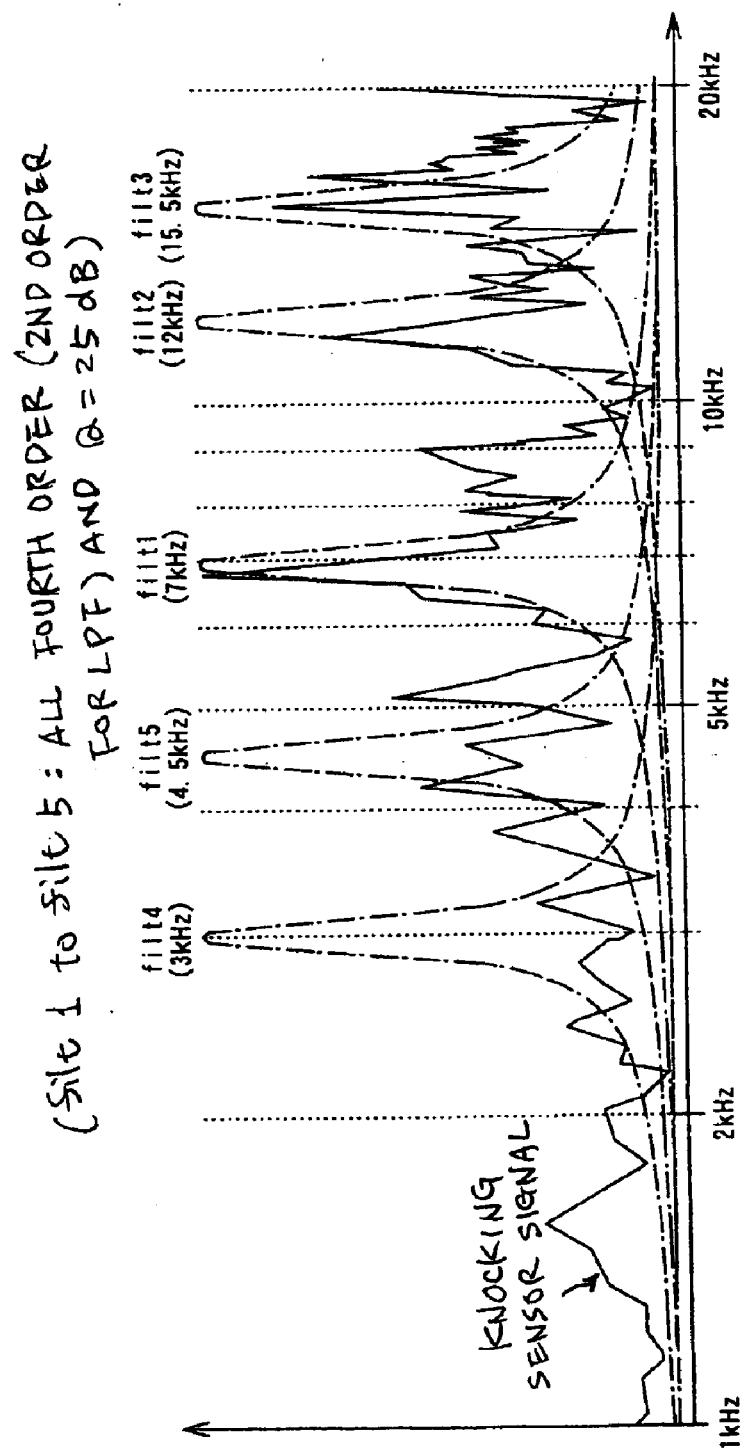
FIG. 14 is a frequency spectrum of conventional filters.

The present first embodiment is different from the conventional in that, as shown in FIG. 4, the noise filters filt4 and filt5 are sharper than the knocking-signal filters filt1 to filt3 in the inclinations of the filtering characteristic curves at cut-off frequencies thereof. Dashed lines in FIG. 4 denote the filtering characteristics of the filters filt1 to filt3, while two-dashed liens in FIG. 4 denote the filtering characteristics of the filters filt4 and filt5. In FIG. 4 where the vertical axis shows gains, a value at which the gain of each filtering characteristic of the filters filt1 to filt5 is attenuated by 3 dB are set to, for example, a nearly 70-percent position of the vertical axis from the bottom thereof (that is, a position of 0.7 when the entire vertical axis is taken as being 1). On the other hand, the nock sensor signal, which is expressed by a solid line in FIG. 4, is still the same as those shown in FIGS. 13 and 14.

Figure 1A:
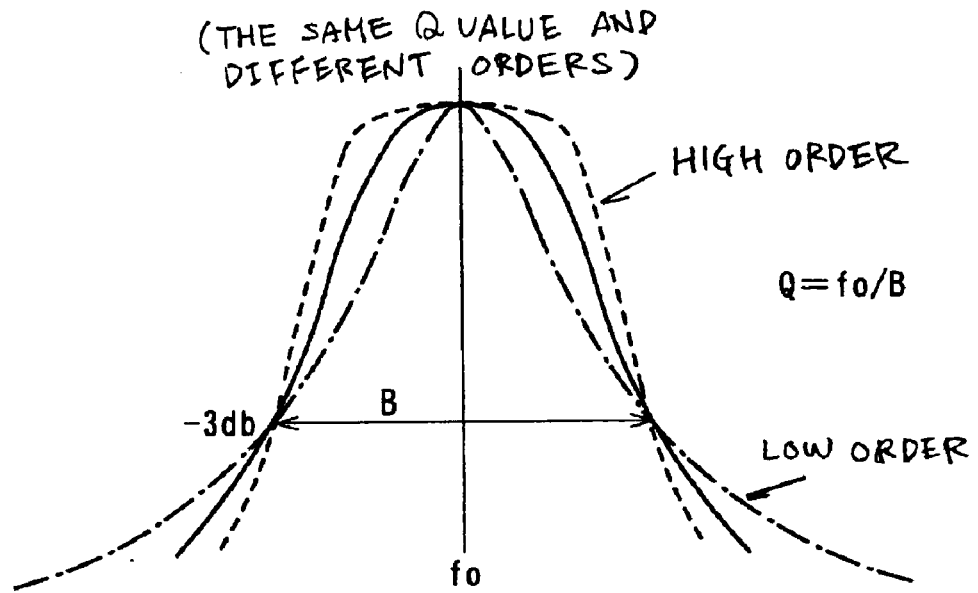
FIGS. 1A and 1B explain the relationship between the order and Q value and a filtering characteristic.
Figure 5:
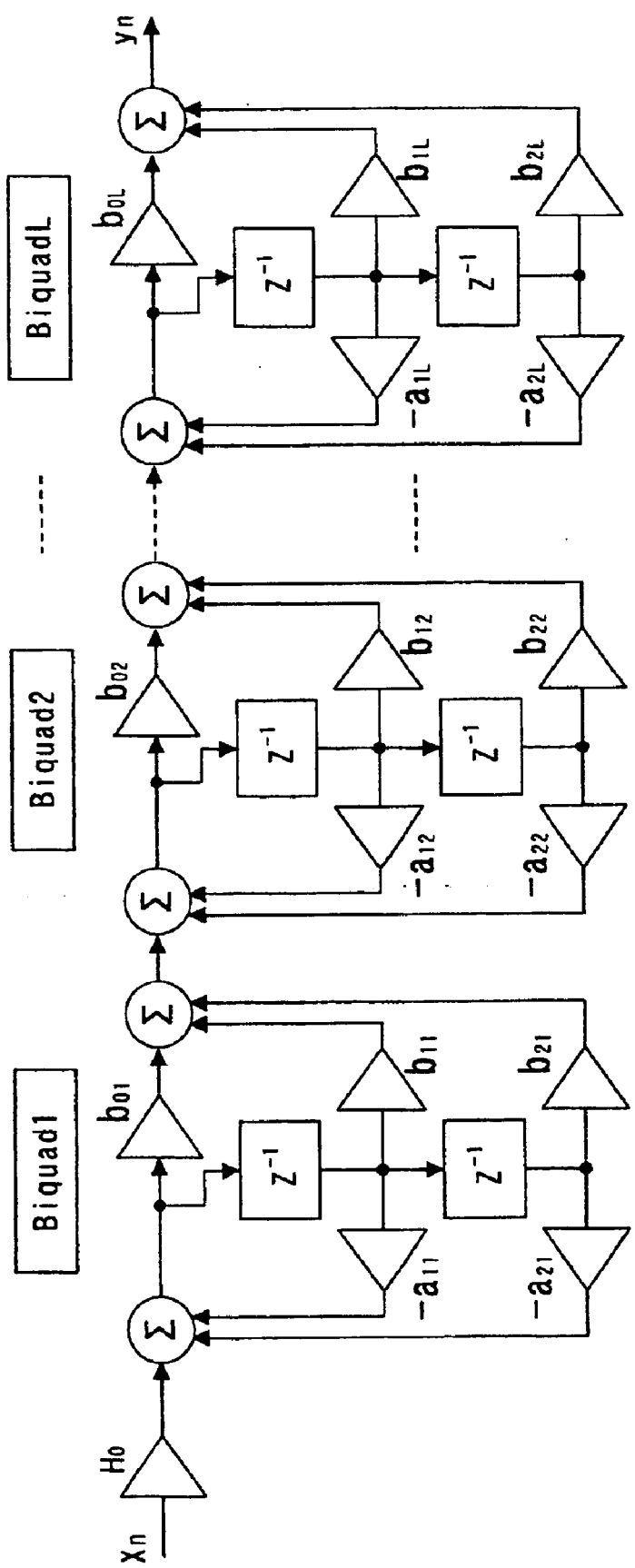
FIG. 5 is a block diagram showing an ordinary IIR filter.

More concretely, each of the five filters filt1 to filt5 is made up of an ordinal IIR (infinite impulse response) having a construction shown in FIG. 5. The order of each of the noise filters filt4 and filt5 is, however, increased higher than those of the noise-signal filters filt1 to filt3. This way of increasing the orders allows the inclinations of the filtering characteristics of the noise filters filt4 and filt5 at the cut-off frequencies thereof to be steeper than those of the knocking-signal filters filt1 to filt3. For instance, a ban-pass filter with a Q value of 10 dB can be made by using a filtering configuration of an order as high as the fourth order. Hence each of the knocking-signal filters filt1 to filt3 has the fourth-order configuration formed by connecting two second-order filters (called "Biquad") in series to each other. In contrast, each of the noise filters filt4 and filt5 has the eighth-order configuration formed by connecting four second-order filters ("Biquad") in series to each other. Why the order numbers are differentiated between the two groups of filters is that the higher the order of a filter, the sharper the filtering characteristic at a cut-off frequency thereof, as long as the Q values of both filters are the same. This fact is illustrated in FIG. 1A.

In the present first embodiment, the actual configuration is as follows. Both the digital filtering block 5 and the knocking determination block 7 are functionally configured by a microcomputer 8 comprising such components as CPU, ROM and RAM. The A/D converter 4 is incorporated in the microcomputer 8.

Further, fed to the engine control apparatus 10 are a rotation number signal composed of a pulse signal obtained every predetermined cranks angle and a cylinder-determining signal composed of a pulse signal obtained every two rotations of an engine. Both the signals, which are known, are supplied to the unit 10 to detect both of a rotation speed and a rotational position of the crankshaft of the engine.

In the engine control apparatus 10, both the rotation number signal and the cylinder-determining signal are sent to the signal producing circuit 11. This circuit 11 uses both the signals to produce a TDC signal (refer to the uppermost stage in FIG. 6), which is a signal falling at a timing at which each cylinder has a top D. C. (dead centre) (hereinafter noted as "TDC"). This TDC signal is supplied to both the microcomputer 8 and the CPU 9. In this example, since the engine has the six cylinders, the TDC signal falls every 120° CA, wherein the "CA" expresses the rotation angle of the crankshaft (i.e., crank angle).

In connection with FIGS. 6 to 9, how the microcomputer 8 serving as the digital filtering block 5 and the knock determining block 7 performs the processing for determining the knocking of the engine.

Figure 6:
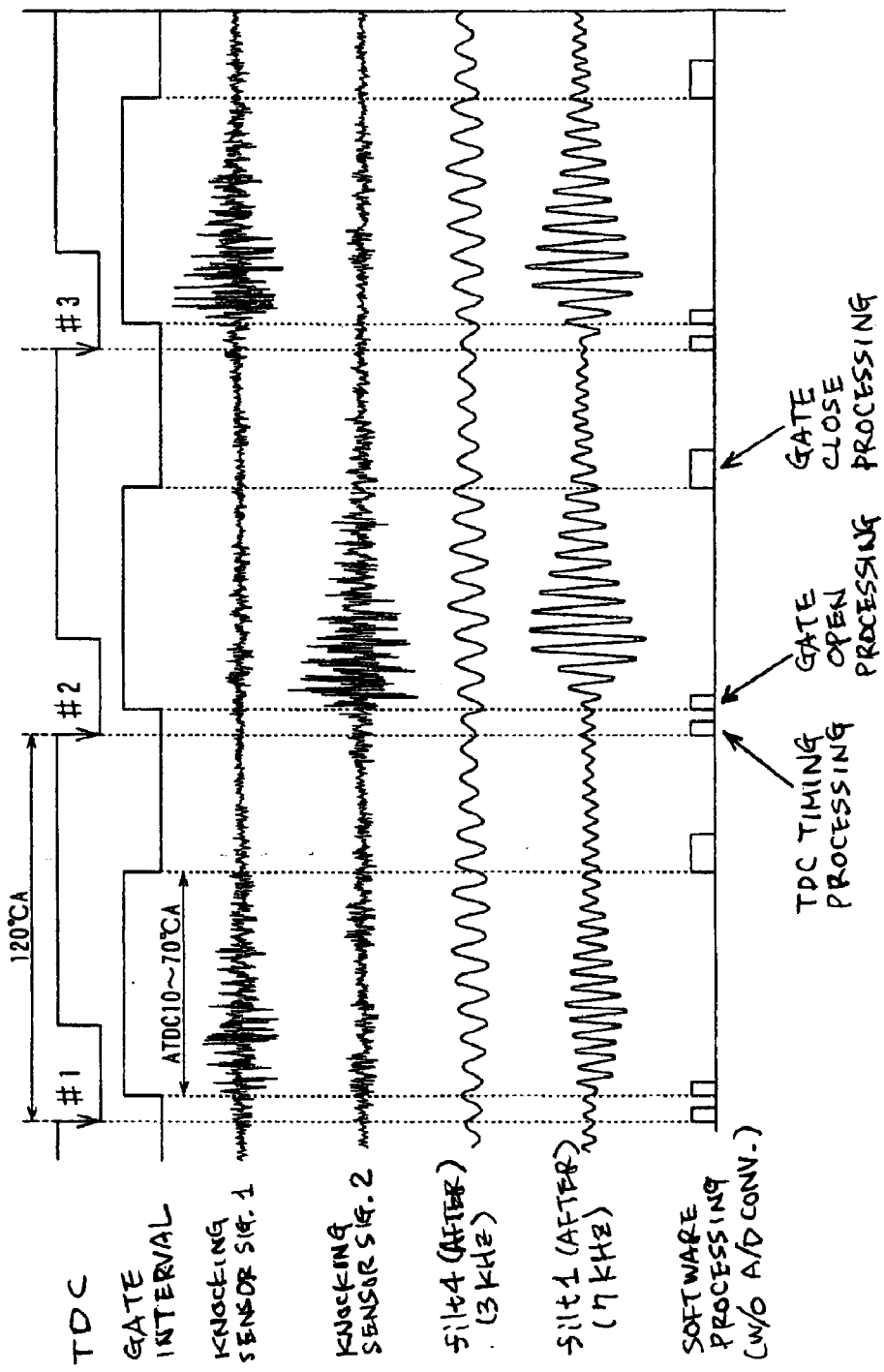
FIG. 6 is a timing chart showing outlined processing executed by a microcomputer employed by the engine control apparatus according to the first embodiment.
Figure 7:
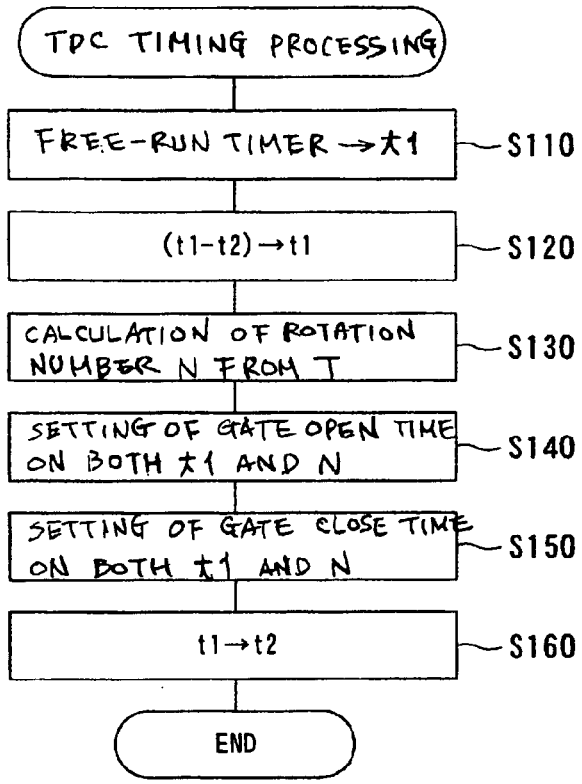
FIG. 7 is a flowchart explaining the processing for TDC timing, which is executed by the microcomputer in the first embodiment.
Figures 8A, 8B:
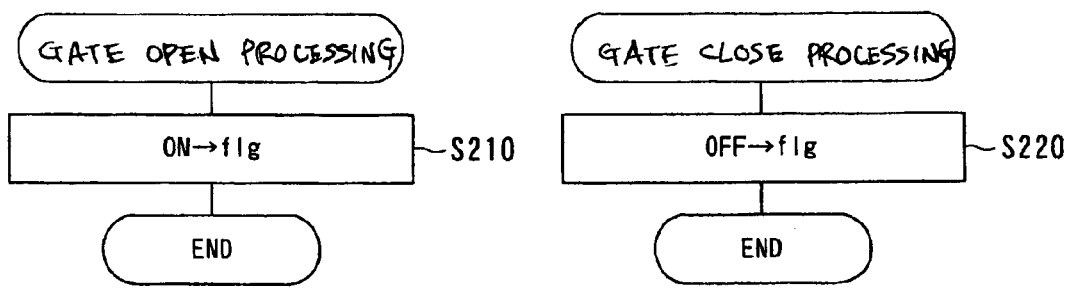
FIGS. 8A and 8B are flowcharts explaining gate open processing and gate close processing, both of which are executed by the microcomputer in the first embodiment.
Figure 9:
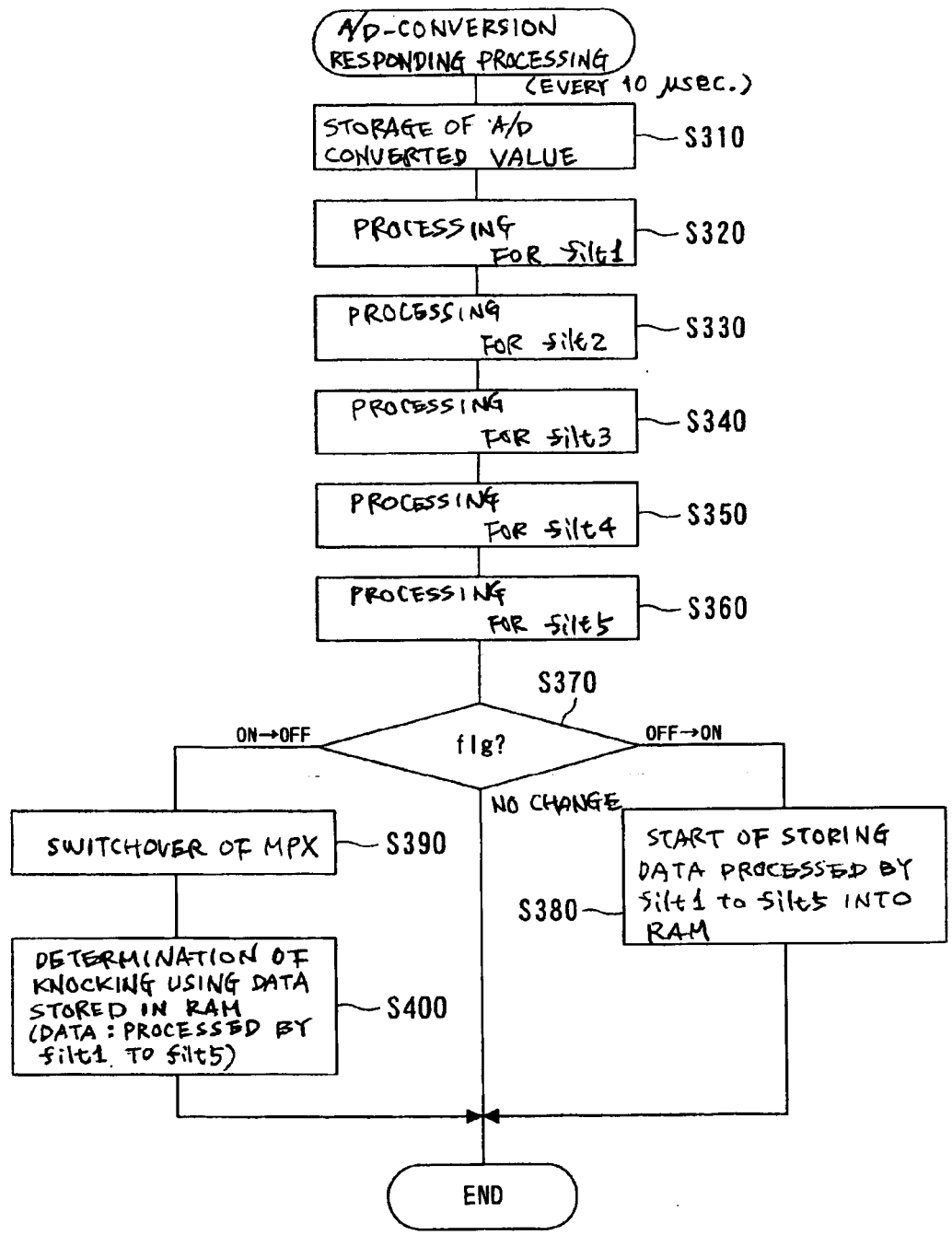
FIG. 9 is a flowchart explaining "A/D-conversion responding processing" executed by the microcomputer in the first embodiment.
Figure 10:
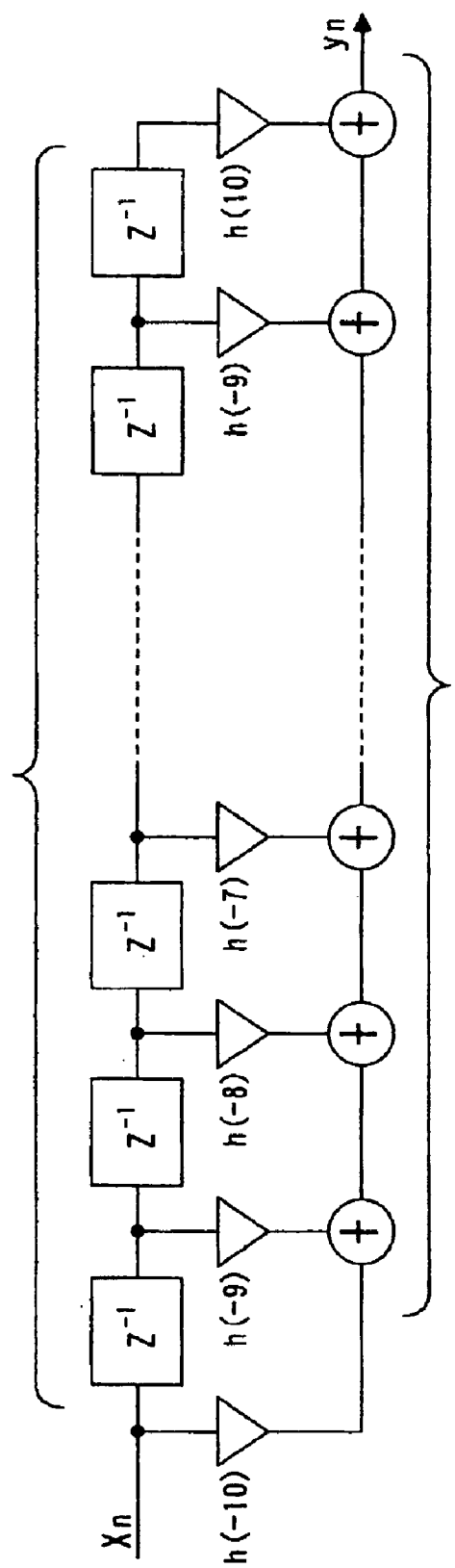
FIG. 10 is a block diagram showing an ordinary FIR filter.

FIG. 6 is a timing chart outlining the processing and FIGS. 7 to 9 are flowcharts indicating the processing performed by the microcomputer 8.

As shown in FIG. 6, in the present embodiment, every cylinder, a gate interval is set as an interval lasting for a certain amount of crank angle (in this example, 60° CA, up to ATDC 70° CA) from a time instant when a predetermined crank angle is realized (in this example, a time instant when an ATDC 10° CA is realized) after the TDC timing. "ATDC" means a crank angle detected after the TDC timing. The knocking determination for each cylinder is carried out during each gate interval using a filtered result of the knocking sensor signal.

In the present embodiment, the configuration is made such that, at a time instant at which the gate interval for each cylinder ends (hereinafter referred to as gate close timing), the multiplexer 3 switches its selection of the knocking sensor signal 1 or 2 from one to the other. The selected new signal is also sent from the multiplexer 3 to the A/D converter 4.

It is thus possible to supply the knocking sensor signal ready for the next cylinder to the A/D converter 4 at the gate close timing to each cylinder. For example, at the gate close timing to the first cylinder #1, the knocking sensor signals supplied to the A/D converter 4 are switched from the knocking sensor signal 1 for the cylinder #1 to the knocking sensor signal 2 for the next cylinder #2. Then at the gate close timing to the first cylinder #2, the knocking sensor signals supplied to the A/D converter 4 are switched from the knocking sensor signal 2 for the cylinder #2 to the knocking sensor signal 1 for the next cylinder #3.

This switching manner makes it easier to have a sufficient period of time from a switchover of the knocking sensor signals supplied to the A/D converter 4, to a time instant at which acquiring data of filtered results begins (i.e., the gate-interval start timing). Since there is a delay time between a switchover of the knocking sensor signals to the A/D converter 4 and a stabilized acquisition of the filtered result data about the knocking sensor signal after the switchover. To cope with the delay, at the gate close timing coming before the TDC timing, the switchover is made to allow the knocking sensor signal for the determination of the next cylinder to be supplied to the A/D converter 4. This ensures that a period of time from the switchover to the start of the gate interval directed to the next cylinder is made longer steadily, i.e., longer than a duration of the delay.

In the following, for the sake of a more simplified explanation, the two knocking sensor signals 1 and 2 are simply noted as a "knocking sensor signal," except for explaining the switchover action of the multiplexer 3.

The TDC timing processing shown in FIG. 7 is activated every time when the TDC signal falls. This processing is executed by the microcomputer 8.

When the TDC timing processing is started by the microcomputer 8, a process at step S110 is first executed, where a current count of a free-run timer is memorized into a memory area t1 in the RAM. The free-run timer is a timer continuously counting up in response to an internal clock in the microcomputer 8.

The processing is then shifted to step S120, where a count in memory area t2 of the RAM is subtracted from the count in the memory area t1 thereof and a resultant subtraction value (=t1−t2) is memorized as being a TDC period of time T. This TDC period of time T corresponds to 120° CA from the last TDC timing to TDC timing of this time. A process at step S6 described later allows the count of the free-run timer at the last TDC timing to be memorized in the memory area t2. Although the TDC period of time T is actually a time of period produced by multiplying the foregoing subtraction value (=t1−t2) by a time counted up one time by the free-run timer (that is, a time required for one cycle of the internal clock signal), the number of counts counted by the free-run timer is treated as time.

The processing is then shifted to step S130, at which the number of rotations N of the engine is calculated from the TDC period of time T computed at step S120. Then at step S140, both the calculated number of rotations N and the count in the memory area t1 are used to decide a gate open time corresponding to a start timing of each gate interval. Namely, in the present embodiment, the gate start timing of each gate interval is ADTC 10° CA. Thus, the number of rotations N is used to compute the number of counts of the free-run timer, the number being equal to the time for the ADTC 10° CA. The number of counts is then added to the value in the memory area t1 to obtain an added value GO, which serves as a gate open time. The added value GO is set into a register '(called "compare register) for timer interruption in order to compare the set value with a count of the free-run timer.

The processing is then conducted at step S150, where both the number of rotations N computed at step S130 and the count in the memory area t1 are used to set a gate close time functioning as an end timing of each gate interval. Namely, in the present embodiment, the gate close timing is ADTC 70° CA. Thus, the number of rotations N is used to compute the number of counts of the free-run timer, the number being equal to the time for the ADTC 70° CA. The number of counts is then added to the value in the memory area t1 to obtain an added value GC, which serves as a gate close time. The added value GC is set into a register for timer interruption in order to compare the set value with a count of the free-run timer.

Then, the processing is moved to step S160 to paste the count in the memory area t1 to that in the memory area t2, before ending the TDC timing processing.

Gate open processing shown in FIG. 8A, which is conducted by the microcomputer 8, is activated in response to appearance of the gate open time set at step S140 in FIG. 7. This gate open time is a time instant realized when the count of the free-run timer agrees with the added value GO. When the microcomputer 8 starts performing this gate open processing, a process at step S210 is performed such that a flag fg showing whether or not it is now in a gate interval is turn on (ON), before the processing is terminated.

Meanwhile, gate close processing shown in FIG. 8B, which is conducted by the microcomputer 8, is activated in response to appearance of the gate close time set at step S150 in FIG. 7. This gate close time is a time instant realized when the count of the free-run timer agrees with the added value GC. When the microcomputer 8 starts performing this gate close processing, a process at step S220 is performed such that the foregoing flag fg is turn off (OFF), before the processing is terminated.

An alternative configuration for the above can be provided, if a system is allowed to detect the crank angle from the TDC timing information on the basis of signals including the foregoing signal indicative of the number of rotations. In such a configuration, at step S140 in FIG. 7, an angle of ATDC 10° CA is given instead of setting the gate open time; at step S150 in FIG. 7, an angle of ATDC 70° CA is given instead of setting the gate close time; the processing shown in FIG. 8A is executed under timing of the ATDC 10° CA that has been given; and the processing shown in FIG. 8B is executed under timing of the ATDC 70° CA that has been given.

A flowchart is shown in FIG. 9, which illustrates the procedures activated by the microcomputer 8 whenever an A/D conversion of the knocking sensor signal ends. In the below, this processing is noted as "A/D-convention responding processing."

When this A/D-convention responding processing is started, a process at step S310 is conducted such that a current value (data) A/D-converted by the A/D converter 4 is memorized. Then processes at steps S320 to S360 follow in turn, where the data of the A/D converted value which has been memorized this time at step S310 is treated as newly inputted data Xn to be processed by the five filters filt1 to filt5. Thus, each of the filters filt1 to filt5 performs the filtering processing on the inputted data Xn.

Then, at step S370, it is determined if or not the flag fg is changed in its flag information, and if changed, it is further determined which way the flag fg is changed from OFF to ON or from ON to OFF.

When it is found that the flag fg is changed from OFF to ON, this situation shows that it is now at the start timing of each gate interval. This allows the processing to proceed to step S380, where setting is made to show that data of the results processed by the filters filt1 to filt5 at steps S320 to S360 should be preserved into the RAM from the foregoing start timing. Once the start setting at step S380 is performed, the data of the results processed by the filters filt1 to filt5 at steps S320 to S360 are preserved into the RAM until the flag fg is changed from ON to OFF and then a process at step S400 is completed.

When it is determined at step S370 that the state of flag fg has not been changed yet at step S370, this A/D-convention responding processing will be ended.

Meanwhile when it is determined at step S370 that the flag fg has changed from ON to OFF, the processing further proceeds to step S390. At step S390, the multiplexer 3 selectively switches its input such that, as sated before, of the knocking sensor signals 1 and 2, a knocking sensor signal coming from a cylinder having the next TDC is supplied to the A/D converter 4.

The processing is then shifted to step S400, at which during an interval showing that the flag fg is ON (namely, during each gate interval), the data of results processed by the filters filt1 to filt5, which have been stored in the RAM, are used to determine if there is an occurrence of knocking. After this determination, this A/D-conversion responding processing will be ended.

Various types of processing for the determination at step S400 can be executed by the microcomputer 8. One type is to use a ratio between a maximum Smax selected from the data of results processed by the three knocking signal filters filt1 to filt3 and a maximum Nmax selected from the data of results processed by the two noise filters filt4 and filt5 (i.e., the ratio=Smax/Nmax). The resultant ratio is then subjected to threshold processing such that it is determined whether or not the radio is equal to or higher than a predetermined value. The determination that the knocking has occurred is made if the ratio is equal to or higher than the predetermined value.

Another type of processing is to detect the shapes of waveforms of knocking sensor signals from the data of results processed by the filters filt1 to filt5. The resultant waveform shapes are subject to determination whether or not there is an occurrence of knocking.

Still another type of processing is originated from storing, into the RAM, the data of results processed by the individual filters filt1 to filt5. Practically, during the interval showing that the flag fg is ON, all of such data are not directly stored in the RAM. Instead of this, such data are accumulated every predetermined number of data or every predetermined crank angle and the accumulated values are stored into the RAM. At step S400, the knocking is determined using the accumulated values. This way is able to reduce a memory capacity necessary for the RAM.

As stated so far, in the present first embodiment, the processing shown in FIGS. 7 and 8 makes it possible to use an interval of ADC 10° to ADC 70° in FIG. 6 as a gate interval.

Further, through the processing shown in FIG. 9, the filtering processing serving as filters filt1 to filt5 is executed on the A/D-converted values of the knocking sensor signals (step S320 to S360); in each gate interval, the data of results processed by the filters filt1 to filt5 are stored in the RAM (step S380); and the knocking determination is made, based on the data stored in the RAM, at a time instant at which each gate interval ends (i.e., gate close timing; the flag fg changes from ON to OFF) (step S400).

As understood from FIG. 9, in this A/D-convention responding processing, the digital filtering (step S320 to S360) continues regardless of being in a gate interval or not (i.e., even in the case that the flag fg is in OFF). The reason is that this type of digital processing requires the past A/D-converted values as well as the newest A/D-converted value.

In the present first embodiment, as understood from the above, the processing executed by the microcomputer 8 at steps S320 to S360 corresponds to a plurality of filter means. This processing is expressed as the digital filtering block 5 in FIG. 3. Of theses filter means, the processing assigned to the knocking signal filters filt1 to filt3 (steps S320 to S340) corresponds to a first type of filtering means, whilst the processing assigned to the noise filters filt4 and filt5 (steps S350 and S360) corresponds to a second type of filtering means. Moreover, the processing executed by the microcomputer 8 (processed as the knocking determination block 7) forms the knocking determination means.

As a result, the engine control apparatus 10 according to the first embodiment is able to provide the configuration in which the results processed by both the knocking signal filters filt1 to filt3 and the noise filters filt4 and filt5 are used to determine the occurrence of the knocking. Particularly, in this configuration, the inclinations of the filtering characteristics of the noise-signal filters filt4 and filt5 at the cut-off frequencies thereof are set to be sharper than those of the knocking signal filters filt1 to filt3.

Thus, as shown in FIG. 4, compared to the knocking signal filters filt1 to filt3, each of the noise filters filt4 and filt5 is able to have a filtering characteristic curve sharper over a region from its pass band to its stop bands. This sharpness in the filtering curve allows gains at the knocking frequencies of 7 kHz, 12 kHz and 15.5 kHz to be sufficiently attenuated. Hence, it is steadily avoided that the knocking signals (i.e., signals indicative of the knocking frequencies) affect the performances of the noise filters filt4 and filt5, so that the occurrence of the knocking is determined with precision.

Meanwhile, in comparison with the noise filters filt4 and filt5, each of the knocking signal filters filt1 to filt3 is able to have the filtering characteristic curve showing more moderate changes in attenuation over a region from its pass bands to its stop bands. This moderate curve has the capability of absorbing changes in some degree in the knocking frequencies, which may be caused due to operation states and/or aging of an engine. That is, the knocking signal filters filt1 to filt3 are able to detect the knocking signals with precision.

Accordingly, there can be provided the main advantage that the engine control apparatus 10 according to the first embodiment makes it possible to increase accuracy in detecting the occurrence of knocking.

In addition, the various additional advantages can be provided as follows.

One of those additional advantages is as follows. Though all the Q values of the filters filt1 to filt5 are the same, i.e., 10 dB in this case, the filter order of each of the noise filters filt4 and filt5 (in this case, the eighth-order) is higher than that of each of the knocking signal filters filt1 to filt3 (in this case, the fourth-order) so that the filters filt4 and filt5 are steeper in the inclinations of the filtering characteristics at their cut-off frequencies than the filters filt1 to filt3. This is advantageous when the occurrence of knocking is detected based on an S/N obtained responsively to appearance of a peak of each knocking signal. The S/N is a proportion between results processed by the filters 1 to 3 and results processed by the filters filt4 and filt5.

To be specific, the knocking signal filters filt1 to filt3 are lower in the filter order, which provides a quicker response responsively to appearance of a peak of each knocking signal. On the other hand, the noise filters filt4 and filt5 are higher in the filter order, resulting in that, even though when there is an occurrence of a higher-level knocking signal, a background level (i.e., noise signals) can be detected without being affected by the knocking signal. Compared to the configuration of assigning a lower order to the filters filt4 and filt5, the foregoing S/N obtained in response to the appearance of a knocking signal can therefore be made larger, thereby detecting the occurrence of knocking with higher precision.

Another additional advantage is to prevent an amount of calculation conducted by the microcomputer 8 from increasing largely, because the knocking signal filters filt1 to filt3 are constructed with the lower filter order.

MODIFICATIONS

Various types of modifications can be directed to the above configuration, which will now be described below.

First Modification

A first modification relates to the sharper inclinations given to the filters filt4 and filt5. By way of example, to make the filters filt4 and filt5 steeper in the inclinations of the filtering characteristics at their cut-off frequencies than the remaining filters filt1 to filt3, filtering factors (amounts "a" and "b" in FIG. 5) may be adjusted to raise the Q values of the filters filt4 and filt5 over that of the filters filt3 and filt4, with the orders of the filters filt1 to filt5 maintained at the same value (for example, the fourth-order).

Figure 1B:
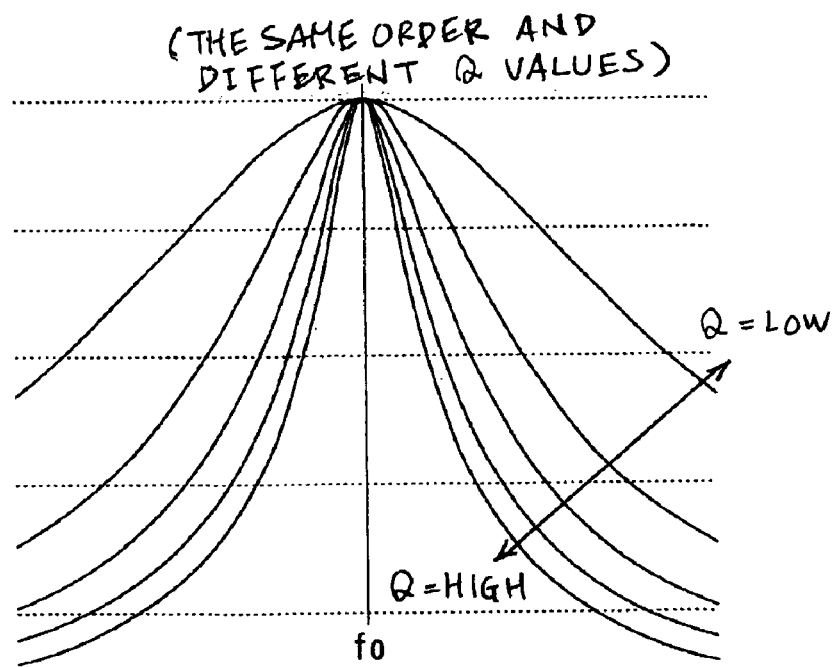
Figure 2A:
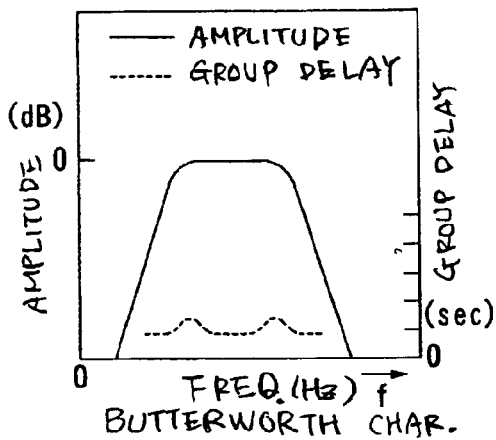
FIGS. 2A to 2D explain a Butterworth characteristic, Chebyshev characteristic, inverse Chebyshev characteristic, and simultaneous Chebyshev characteristic.
Figure 2B:
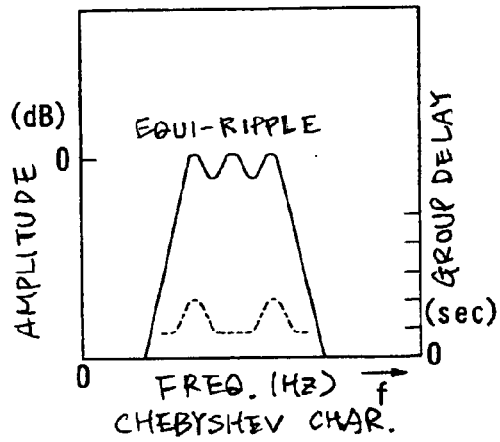
Figure 2C:
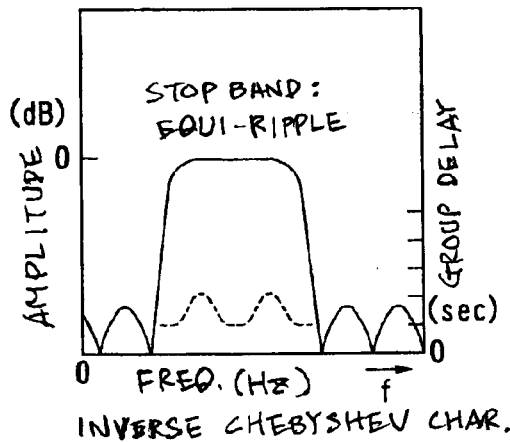
Figure 2D:
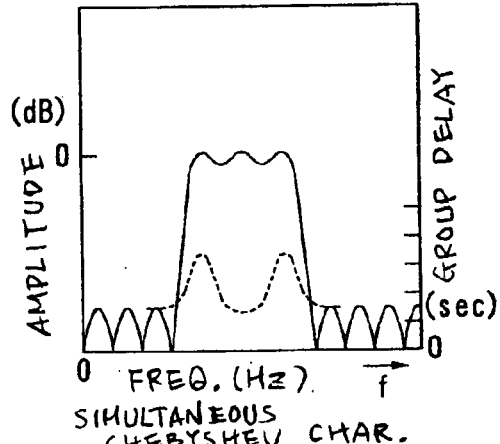

There can be provided a practical example in which the filters filt4 and filt5 are set to have a Q value of 25 dB, while the filters filt1 to filt3 are set to have a Q value of 10 dB or 6 dB. This construction is based on the fact that, as shown in FIG. 1B, the higher the Q value, the sharper the filtering characteristic at the cut-off frequency, provided that the filter orders are the same. It is not necessarily limited, however, to the construction in which the orders of all the filters filt1 to filt5 are the same.

It is also possible for the first modification to increase accuracy in detecting the occurrence of knocking in the similar manner to the foregoing first embodiment.

Second Modification

A second modification concerns with types of filters that can be applied to the present invention.

FIR filters can be used as the filters filt1 to filt5, instead of the IIR filters, in the foregoing first embodiment and the foregoing first modification. The configuration of a typical FIR (finite impulse response) filter is exemplified in FIG. 10, though it is well known.

Third Modification

A third modification is provided to explain various types of filtering characteristics given to the noise and knocking signal fitters.

In the first embodiment and the first modification, it is preferred to provide any of the Chebyshev characteristic (refer to FIG. 2B), inverse Chebyshev characteristic (refer to FIG. 2C), and simultaneous Chebyshev characteristic (refer to FIG. 2D) with the noise filters filt4 and filt5 and to provide the Butterworth characteristic (refer to FIG. 2A) with the knocking signal filters filt1 to filt3. Incidentally, the simultaneous Chebyshev characteristic is frequently called "elliptic characteristic."

The reason is as follows. If the filter orders are the same, the Chebyshev characteristic, inverse Chebyshev characteristic, and simultaneous Chebyshev characteristic are steeper in their attenuation characteristics than the Butterworth characteristic. This means that the Chebyshev characteristic, inverse Chebyshev characteristic, and simultaneous Chebyshev characteristic are more appropriate for use as the noise filters filt4 and filt5, than the Butterworth characteristic. On the contrary, the Butterworth characteristic is effective in suppressing both an overshoot and an undershoot, because the gain is flat over the pass band thereof. As a result, the Butterworth characteristic is more proper for use as the knocking signal filters filt1 to filt3 requiring that the knocking signals be detected with precision. Hence, combining the filtering characteristics as described above makes it possible to reduce the total number of orders for all the filters filt1 to filt5 down to a value as small as possible, which leads to a less amount of calculation burdening the filters.

Fourth Modification

A fourth modification is also provided to explain various types of filtering characteristics given to the noise and knocking signal fitters.

In the first embodiment and the first modification, it is also preferred to provide the simultaneous Chebyshev characteristic with the noise filters filt4 and filt5 and to provide the Butterworth characteristic or inverse Chebyshev characteristic with the knocking signal filters filt1 to filt3.

Among the four characteristics shown in FIGS. 2A to 2D, the simultaneous Chebyshev characteristic can be sharpest in the attenuation characteristic on condition that the same filter order is given. Thus, employing the simultaneous Chebyshev characteristic itself as the noise filters filt4 and filt5 makes it possible to reduce the filter orders of the noise filters filt4 and filt5 to a number as small as possible. Like the Butterworth characteristic, the inverse Chebyshev is preferable to the knocking signal filters filt1 to filt3, because the gain curve is flat over its pass band.

Additionally, in the case of the third and fourth modifications, it is not always necessary to give all the filters filt1 to filt5 the same filter order or the same Q value, but may be possible to modify those values.

SECOND EMBODIMENT

A second embodiment of the present invention will now be described.

An engine control apparatus according to the second embodiment can be expressed in comparison with the engine control apparatus 10 according to the first embodiment. Practically, the foregoing noise filters filt4 and filt5 are formed as IIR filters and the foregoing knocking-signal filters filt1 to filt3 are formed as FIR filters. In this configuration, like the foregoing first embodiment, the filter order and filtering coefficients of each of the filters filt1 to filt5 are adjusted in such a manner that the noise filters filt4 and filt5 is sharper than the knocking-signal filters filt1 to filt3 in the inclinations of the filtering characteristics at their cut-off frequencies.

Applying the IIR and FIR filters to the filters filt1 to filt5 in this way is also advantageous as follows.

First of all, the FIR filter is better in a phase characteristic than the IIR filter. Hence applying the FIR filter to each of the knocking signal filters filt1 to filt3 makes it easier to detect features of knocking in the knocking sensor signal in a more accurate manner.

Another advantage also concerns with FIR filters. Provided that FIR filters operate at equal sampling intervals and have the same Q value, filters assigned to the high frequency side can be made smaller in their filter orders than filters assigned to the low frequency side. In this situation, compared to the noise filters filt4 and filt5, the knocking signal filters filt1 to filt3 can be produced to have higher filtering frequencies. Accordingly, using the FIR filters as the knocking signal filters filt1 to filt3 enables their filter orders to remain at lower values.

On the other hand, applying IIR filters to the noise filters filt4 and filt5 easily realizes filtering characteristics whose inclinations are sharper at their cut-off frequencies, with their filter orders sill maintained at lower values, compared to application of the FIR filters.

As a result, the configurations of the filters filt1 to filt5 in the second embodiment make it possible to lower, in totality, the filter orders of the filters filt1 to filt5 and to determine the occurrence of knocking with precision.

THIRD EMBODIMENT

A third embodiment of the present invention will now be described in connection with FIG. 11.

Figure 11:
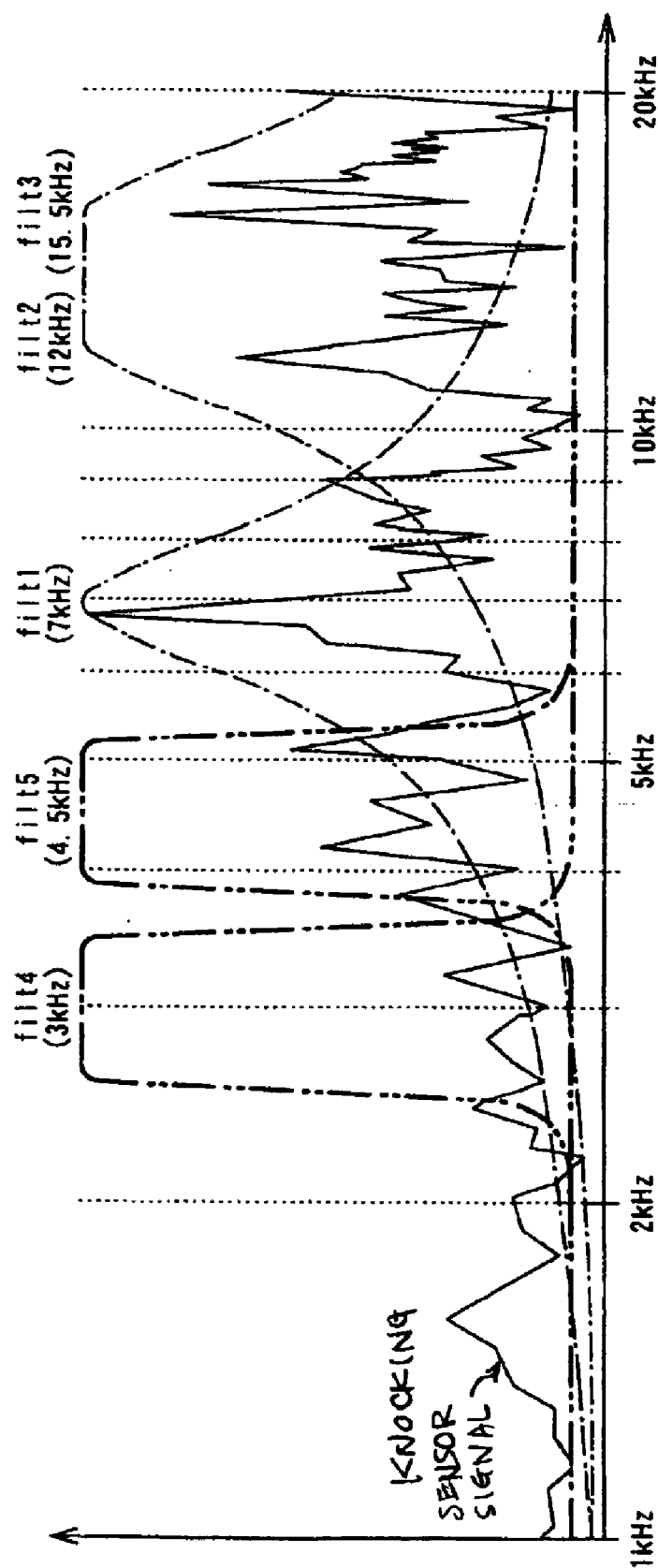
FIG. 11 is a frequency spectrum of four filters filt1, filt2, filt4 and filt5 employed in a second embodiment according to the present embodiment.

An engine control apparatus according the third embodiment uses filtering characteristics shown in FIG. 11, in which, compared to the foregoing embodiments and modifications, the filter filt3 is removed. Instead, the pass band of the adjacent filter filt2 is extended to cover another frequency, so that the pass band exists in a frequency range including a plurality of knocking frequencies (in this example, 12 kHz and 15.5 kHz). That is, of the plural knocking signals, mutually adjacent signals of frequencies 12 kHz and 15.5 kHz are detected at the same time by the one filter filt2. The filter filt2 that has such a wider pass band can be constructed by combining a low-pass filter and a high-pass filter.

Accordingly, the filter configurations of the third embodiment are advantageous, because the number of filters can be reduced, thereby an amount of calculation for filtering being reduced.

An additional advantage inherent to this filter configuration can also be obtained. In cases where a plurality of knocking frequencies are closer to each other on the frequency spectrum, to separate those knocking frequencies with precision requires filters both of which Q values and filter orders are high. On top of this, even such filters are used, there remain some cases in which the features of the knocking signals are grasped steadily. In such a case, however, the filter configuration according to the fourth embodiment can work well, because one filter covers a wider frequency area.

FOURTH EMBODIMENT

A fourth embodiment of the present invention will now be described in connection with FIG. 12.

Figure 12:
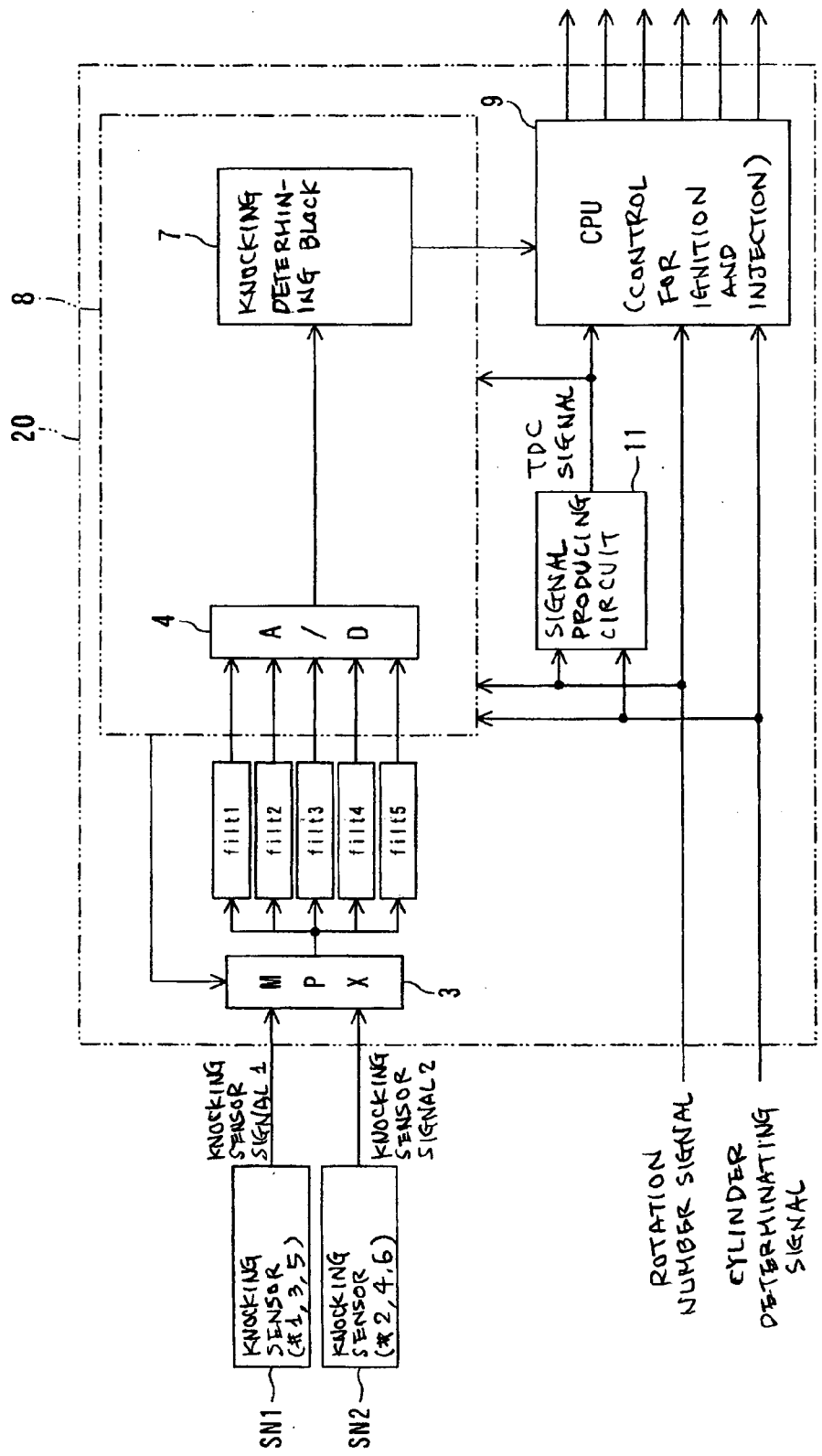
FIG. 12 is a block diagram outlining the configuration of an engine control apparatus according to a fourth embodiment of the present invention.

An engine control apparatus according to the fourth embodiment is provided, as shown in FIG. 12, with analog filters filt1 to filt5 made of analog components such as resistors and capacitors.

The knocking sensor signals 1 and 2 outputted from the multiplexer 3 are selected in turn and supplied to the plural analog-type filters filt1 to filt5. The resultant filtered signals from the filters filt1 to filt5 are then sent to the A/D converter 4 functionally established in the microcomputer 8. The microcomputer 8 applies A/D conversion to the filtered signals, before determining the occurrence of knocking of an engine.

Specifically, in this fourth embodiment, a period of time during which the flag fg is ON, which has been explained with reference to FIGS. 7 and 8, can be used. During the period of time, the output signals from the filters filt1 to filt5 are subjected to the A/D conversion every specified period of time (for example, every 10 $\mu$sec), and the resultant A/D-converted values (i.e., result data processed by the filters filt1 to filt5) are stored into the RAM of the microcomputer 8. In response to a change of the flag fg from ON to OFF, the processes similar to steps S390 and S400 in FIG. 9 are executed, whereby both of the switchovers of the multiplexer 3 and the knocking determination on the output data from the filters filt1 to filt5 are carried out.

Accordingly, the engine control apparatus 20 according to the fourth embodiment is able to provide the similar or identical advantages to those obtained in the first embodiment.

As a further modification concerning the fourth embodiment, both the foregoing first modification and the third embodiment can be reduced into practice by using the foregoing analog type filters filt1 to filt5.

The foregoing configuration described in all the embodiments and medications can be modified into other forms.

For example, an IC dedicated to the processing for the knocking detection can be used separately from the microcomputer 8.

A further modification is concerned with a relationship between the filtering frequencies of the noise filters and the knocking signal filters. In the foregoing, it has been described that the filtering frequencies of the noise filters are lower than those of the knocking signal filters. This largeness relationship between the filtering frequencies can be reversed. That is, the filtering frequencies of the noise filters may be higher than those of the knocking signal filters or may lie between two knocking frequencies (for instance, a first order frequency and its 1.5-th order harmonics frequency).

Another modification is directed to types of the knocking sensor. The knocking sensor can be formed into any of a vibration type sensor, ion current type sensor, and cylinder inner pressure type sensor.

The present invention may be embodied in other specific forms without departing from the spirit or essential characteristics thereof. The present embodiments are therefore to be considered in all respects as illustrative and not restrictive, the scope of the present invention being indicated by the appended claims rather than by the foregoing description and all changes which come within the meaning and range of equivalency of the claims are therefore intended to be embraced therein.

The entire disclosure of Japanese Patent Application No. 2003-109409 filed on Apr. 14, 2003 including the specification, claims, drawings and summary are incorporated herein by reference in its entirety.

What is claimed is:

1. An apparatus for detecting occurrence of knocking of an engine from a signal sensed by a knocking sensor attached to the engine, comprising:

a plurality of filters extracting, from the signal sensed by the knocking sensor, a plurality of signal components whose frequency bands differ from each other; and a knocking determination unit determining whether or not there is the occurrence of knocking on a basis of results outputted from the plurality of filters, wherein the plurality of filters include a first type of filter of which pass band is set to a first specific frequency band including a first specific frequency of the signal from knocking sensor, the first specific frequency indicating the occurrence of knocking, and a second type of filter of which pass band is set to a second specific frequency band other than the first specific frequency band, wherein both of the first and second types of filters have filtering characteristics, an inclination of the filtering characteristic of the second type of filter at a cut-off frequency thereof being steeper than an inclination of the filtering characteristic of the first type of filter at a cut-off frequency thereof.

2. The apparatus according to claim 1, wherein the first and second types of filters are composed of digital filters performing digital filtering on data obtained by applying an A/D conversion to the signal sensed by the knocking sensor at predetermined sampling intervals.

3. The apparatus according to claim 2, wherein the second type of filter is higher in a filter order than the first type of filter.

4. The apparatus according to claim 2, wherein the second type of filter is higher in a Q value than the first type of filter.

5. The apparatus according to claim 2, wherein both of the first and second types of filters are formed as IIR filters, the second type of filter having a filtering characteristic set to be any of a Chebyshev characteristic, an inverse Chebyshev characteristic, and a simultaneous Chebyshev characteristic and the first type of filter having a filtering characteristic set to be a Butterworth characteristic.

6. The apparatus according to claim 2, wherein both of the first and second types of filters are formed as IIR filters, the second type of filter having a filtering characteristic set to be a simultaneous Chebyshev characteristic and the first type of filter having a filtering characteristic set to be any of an inverse Chebyshev characteristic and a Butterworth characteristic.

7. The apparatus according to claim 2, wherein the second type of filter is formed as an IIR filter and the first type of filter is formed as an FIR filter.

8. The apparatus according to claim 2, wherein each of the first type of filter is composed of a plurality of filters of which pass bands are set to mutually-different specific frequency bands each serving as the first specific frequency band and each of the second type of filter is composed of a plurality of filters of which pass bands are set to mutually-different specific frequency bands each serving as the second specific frequency band wherein the mutually-different specific frequency bands each serving as the first specific frequency band have central frequencies set to a plurality of frequencies each serving as the first specific frequency.

9. The apparatus according to claim 8, wherein at least one of the plurality of filters belonging to the first type of filter has the pass band ranging at least two specific frequency bands belong to the first specific frequency band.

10. The apparatus according to claim 2, wherein each of the first type of filter includes a filter of which pass band is set a frequency band including a plurality of frequencies each indicating the occurrence of knocking.

11. The apparatus according to claim 1, wherein the second type of filter is higher in a filter order than the first type of filter.

12. The apparatus according to claim 11, wherein each of the first type of filter is composed of a plurality of filters of which pass bands are set to mutually-different specific frequency bands each serving as the first specific frequency band and each of the second type of filter is composed of a plurality of filters of which pass bands are set to mutually-different specific frequency bands each serving as the second specific frequency band wherein the mutually-different specific frequency bands each serving as the first specific frequency band have central frequencies set to a plurality of frequencies each serving as the first specific frequency.

13. The apparatus according to claim 12, wherein at least one of the plurality of filters belonging to the first type of filter has the pass band ranging at least two specific frequency bands belong to the first specific frequency band.

14. The apparatus according to claim 1, wherein the second type of filter is higher in a Q value than the first type of filter.

15. The apparatus according to claim 14, wherein each of the first type of filter is composed of a plurality of filters of which pass bands are set to mutually-different specific frequency bands each serving as the first specific frequency band and each of the second type of filter is composed of a plurality of filters of which pass bands are set to mutually-different specific frequency bands each serving as the second specific frequency band wherein the mutually-different specific frequency bands each serving as the first specific frequency band have central frequencies set to a plurality of frequencies each serving as the first specific frequency.

16. The apparatus according to claim 15, wherein at least one of the plurality of filters belonging to the first type of filter has the pass band ranging at least two specific frequency bands belong to the first specific frequency band.

17. The apparatus according to claim 1, wherein each of the first type of filter is composed of a plurality of filters of which pass bands are set to mutually-different specific frequency bands each serving as the first specific frequency band and each of the second type of filter is composed of a plurality of filters of which pass bands are set to mutually-different specific frequency bands each serving as the second specific frequency band wherein the mutually-different specific frequency bands each serving as the first specific frequency band have central frequencies set to a plurality of frequencies each serving as the first specific frequency.

18. The apparatus according to claim 17, wherein at least one of the plurality of filters belonging to the first type of filter has the pass band ranging at least two specific frequency bands belong to the first specific frequency band.

19. The apparatus according to claim 1, wherein each of the first type of filter includes a filter of which pass band is set a frequency band including a plurality of frequencies each indicating the occurrence of knocking.

* * * * *